United States Patent Office 3,439,595
Patented Apr. 22, 1969

3,439,595
EXPOSURE CONTROL DEVICE FOR PHOTOGRAPHIC CAMERAS
Gerd Kiper, Unterhaching, near Munich, Germany, assignor to Agfa-Gevaert Aktiengesellschaft, Leverkusen, Germany
Filed Feb. 6, 1967, Ser. No. 614,059
Claims priority, application Germany, Feb. 9, 1966, A 51,528
Int. Cl. G01j 1/52
U.S. Cl. 95—10      12 Claims

ABSTRACT OF THE DISCLOSURE

Exposure control device for photographic cameras. Selects the exposure time and the size of the diaphragm aperture as a function of the intensity of scene light. In a higher range of intensities, a time delay circuit varies both the exposure time and the aperture. In a lower range of intensities, the delay circuit varies only the exposure time while the size of the aperture remains unchanged and is maintained at a maximum value. A branch circuit which is characteristic of the lower range of intensities is connected in the delay circuit by a movable part of the shutter if the shutter remains open longer than required for full opening of the diaphragm.

BACKGROUND OF THE INVENTION

The present invention relates to exposure control devices for photographic cameras, and more particularly to improvements in exposure control devices wherein the size of the diaphragm aperture and the exposure time are regulated as a function of the intensity of scene light. Still more particularly, the invention relates to improvements in exposure control devices of the type wherein an electrical delay circuit regulates the size of the aperture and the exposure time.

In presently known photographic cameras of the just outlined character, the time delay circuit will effect proper selection of both exposure values with requisite accuracy when the intensity of scene light is relatively high or relatively low, i.e., within a first range of relatively high intensities or within a second range of relatively low intensities. However, the conventional delay circuits cannot select proper exposure time and proper size of the diaphragm aperture within both such light intensity ranges.

Accordingly, it is an important object of the present invention to provide an exposure control device which embodies a time delay circuit and wherein such circuit will effect satisfactory selection of both exposure values within a wider range of intensities of scene light, to assemble such exposure control device of simple component parts, and to construct the time delay circuit in such a way that the selection of both exposure values is effected in a fully automatic way, not only when both exposure values are changed simultaneously but also when the intensity of scene light is so weak that the size of the aperture must be set at its maximum value and the exposure control device thereupon regulates only the exposure time.

SUMMARY OF THE INVENTION

The invention resides in the provision of an exposure control device for photographic cameras. The exposure control device comprises setting means operative to select the exposure time and the size of the diaphragm aperture, actuating means movable in response to movement of the setting means, an electric time delay circuit including electromagnet means for operating the setting means as a function of the intensity of scene light within two successive operating ranges in the first of which the exposure time is varied together with the size of the aperture and in the second of which the exposure time is varied while the size of the aperture remains unchanged, and first and second branch circuits characteristic of first and second intensity ranges of scene light. The actuating means is arranged to connect one of the branch circuits into the time delay circuit in response to completion by the setting means of the first operating range, i.e., when the exposure time is longer than necessary to increase the size of the aperture to its maximum value.

The actuating means may be constituted by a portion of a movable shutter setting member or by a shutter blade. Each branch circuit may comprise a photosensitive resistor and one of the branch circuits may be permanently connected in the time delay circuit. Alternatively, the one branch circuit is connected in the time delay circuit by a double-throw switch which is actuated by the actuating means and simultaneously disconnects the other branch circuit.

The novel features which are considered as characteristic of the invention are set forth in particular in the appended claims. The improved exposure control device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
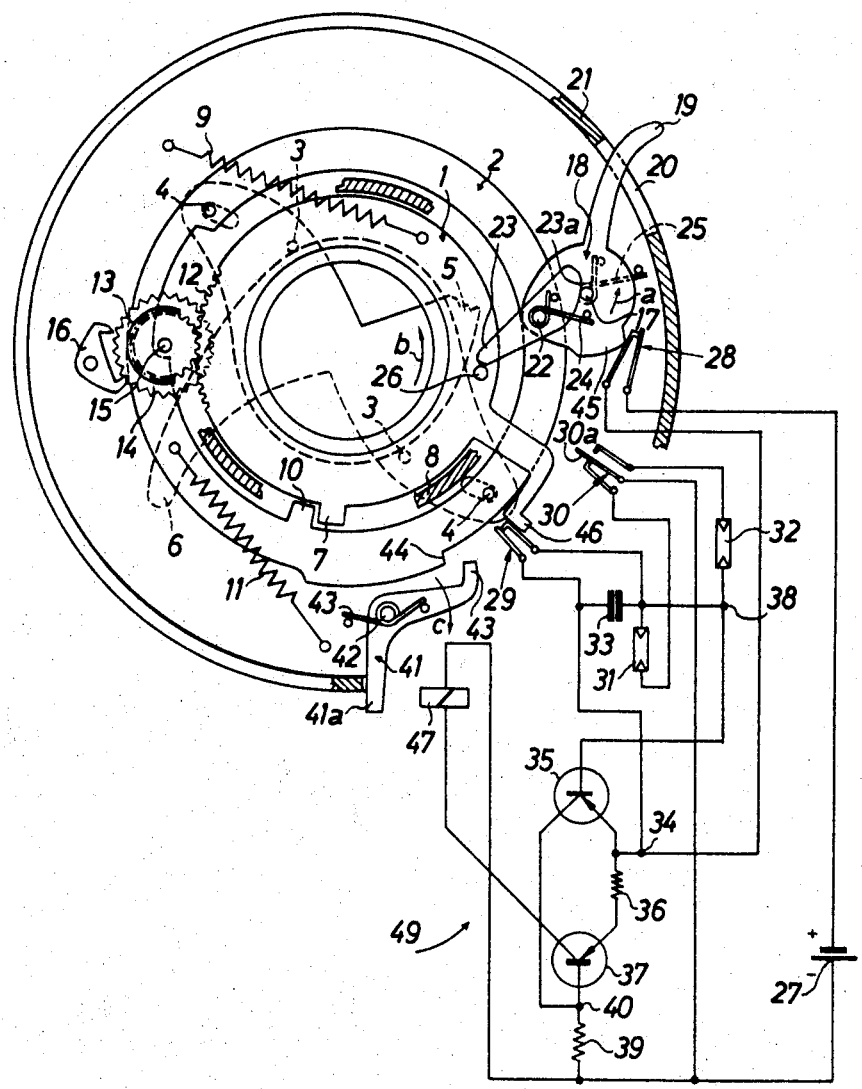
FIG. 1 is a schematic front elevational view of a portion of a still camera including an exposure control device which embodies one form of the present invention.

Referring first to FIG. 1, there is shown a portion of a photographic still camera whose shutter comprises setting means including two spring-biased setting rings 1, 2 which are respectively provided with pivot pins 3, 4 for shutter blades 5, 6. Each of these blades is pivotable on one of the pins 3 and has an elongated slot for one of the pins 4. The setting ring 1 is further provided with a radially outwardly extending projection 7 which can move into abutment with a stationary stop 8 in order to limit rotary movement of the setting ring 1 in a counterclockwise direction. The setting ring 1 is biased in such direction by a helical return spring 9. The other setting ring 2 has an inwardly extending projection 10 which is biased against the projection 7 of the setting ring 1 by a second helical return spring 11.

The setting ring 1 has a toothed portion 12 which meshes with a pinion 13 on a shaft 15. This shaft 13 further carries an escapement wheel 14 which cooperates with a pallet 17. The parts 12–16 constitute a conventional retarding unit for the setting ring 1.

The means for cocking and releasing the shutter comprises a combination cocking and release plate 18 which is pivotable on a fixed pin 17 and comprises a manually operable arm 19 extending through a slot 20 in the shutter housing 21. The plate 18 further carries a pin 22 for a motion transmitting pawl 23 which is biased by a torsion spring 24 so that it tends to turn in a clockwise direction, as viewed in FIG. 1. The spring 24 normally maintains an end face portion 23a of the pawl 23 in abutment with the pivot pin 17. A further torsion spring 25 biases the plate 18 in a clockwise direction. When the arm 19 is moved in the direction of arrow a, the pawl 23 engages with a post 26 of the setting ring 1 and cocks this ring by simultaneously moving its projection 7 away from the fixed stop 8 whereby the return spring 9 stores energy. The projection 7 entrains the projection 10 of the setting ring 2 so that the latter is cocked simultaneously with the setting ring 1 and causes its return spring 11 to store energy. During such cocking, the setting rings 1 and 2 are rotated in a direction counter to that indicated by an arrow b.

The aforementioned retarding unit 12–16 determines the speed at which the setting ring 1 turns back to its uncocked position once the pawl 23 has been moved beyond the post 26. The retarding unit for the second setting ring 2 is illustrated in the lower right-hand portion of FIG. 1 and comprises an electric time delay circuit 49. This time delay circuit 49 includes a source of electrical energy, for example, a battery 27 or a miniature accumulator, and a master switch 28 which is connected in series with the battery 27 and normally tends to assume an open position but is closed in automatic response to anticlockwise rotation of the arm 19. Such closing is effected by a cam lobe 45 of the plate 18. The time delay circuit also includes a control switch 29 which is normally open and a double-throw switch 30. The switches 28, 29, 30 are connected in series and the switch 30 can connect into the time delay circuit 49 the one or the other of two branch circuits which respectively comprise light-sensitive receivers 31, 32. In FIG. 1, the receivers 31, 32 are constituted by photosensitive resistors. A capacitor 33 is connected in parallel with the control switch 29.

The master switch 28 connects the positive pole of the battery 27 directly with a junction 34 which is further connected with the collector of a first transistor 35 and with the collector of a second transistor 37. The connection between the junction 34 and collector of the second transistor 37 comprises a fixed resistor 36. The base of the first transistor 35 is connected with a junction 38 between the photosensitive resistors 31, 32. The junction 83 is further connected with one plate of the capacitor 33 and with one contact of the control switch 29. The base of the second transistor 37 is connected with the negative pole of the battery 27, and such connection comprises a fixed resistor 39. A third junction 40 between the base of the second transistor 37 and resistor 39 is connected with the emitter of the first transistor 35. The emitter of the second transistor 37 is connected with the negative pole of the battery 27, and such connection comprises an electromagnet 47.

The armature of the electromagnet 47 is constituted by one arm 41a of a two-armed blocking lever 41 which is pivotable on a fixed pin 42. A torsion spring 43 tends to bias the lever 41 in a clockwise direction (arrow c) so as to move the armature 41a into abutment with a stop shoulder of the housing 21. The other arm of the lever 41 has a hook-shaped projection 43 which can engage a radial face 44 of the second setting ring 2.

The master switch 28 can be closed by the aforementioned cam lobe 45 of the plate 18. The switches 29 and 30 can be operated by an outwardly projecting actuating portion or trip 46 of the first setting ring 1. The switches 28 and 29 tend to remain in open positions and the movable median contact 30a of the double-throw switch 30 normally tends to assume the position which is shown in FIG. 1 and in which the first branch circuit including the photosensitive resistor 31 is connected in the time delay circuit 49.

An important advantage of the improved exposure control device is that the branch circuits are extremely simple, i.e., each such branch circuit merely includes a photosensitive resistor (31 or 32) which is preferably mounted in or adjacent to the front wall of the camera casing so as to be exposed to scene light. All other electrical components (such as the capacitor 33, transistors 35, 37, battery 27 and electromagnet 47) which contribute to proper selection of the delay with which the trailing setting ring 2 is released to close the shutter and to reduce the size of the aperture to zero form part of the circuit 49.

The operation is as follows:

If the user wishes to make an exposure, the arm 19 is grasped by hand and is moved in the direction indicated by arrow a whereby the plate 18 and pawl 23 pivot in a counterclockwise direction and the pawl 23 moves the setting rings 1 and 2 (through the intermediary of post 26 and projections 7, 10) in a direction counter to that indicated by the arrow b. The return springs 9 and 11 store energy. During pivoting of the plate 18 in a counterclockwise direction, the cam lobe 45 closes the master switch 28 and the actuating portion or trip 46 of the setting ring 1 closes the control switch 29 shortly thereafter. Thus, a current will flow through the collector and emitter of the second transistor 37 to effect energization of the electromagnet 47. This electromagnet attracts its armature 41a whereby the projection 43 of the lever 41 enters into the path of the radial face 44 on the setting ring 2 and prevents return movement of this setting ring prior to deenergization of the electromagnet 47. A current also flows through the control switch 29 and photosensitive resistor 31.

The operator continues to move the arm 19 in a counterclockwise direction until the pawl 23 moves beyond the post 26 whereby the return spring 9 begins to contract and rotates the setting ring 1 in a counterclockwise direction (arrow b) at the speed determined by the retarding unit 12–16. Shortly or immediately after the setting ring 1 begins to return under the bias of its return spring 9, the actuating portion or trip 46 moves away from the control switch 29 so that this switch opens and the charging of capacitor 33 begins. This capacitor 33 is connected in parallel with the control switch 29. The time required for charging the capacitor 33 depends on the resistance offered by the photosensitive resistor 31, and such resistance is a function of the intensity of scene light. During charging of the capacitor 33, the base of the first transistor 35 becomes progressively negative and, on reaching a predetermined potential, an emitter-collector current begins to flow through the transistor 35 and raises the potential of the base of the transistor 37 until the transistor 37 begins to block and terminates the flow of current through the winding of the electromagnet 47. The spring 43 immediately moves the armature 41a into the position shown in FIG. 1 whereby the projection 43 moves away from the face 44 (arrow c) and allows the second setting ring 2 to rotate in response to the bias of its return spring 11 (arrow b). The return movement of the setting ring 2 is very rapid because nothing obstructs such movement once the projection 43 is moved out of the way. The exact moment of release of the setting ring 2 will determine the size of the exposure aperture which is defined by the shutter blades 5, 6. Also, on return to the uncocked position, the setting ring 2 will terminate the exposure time. Both exposure values are selected as a function of the intensity of scene light because the photosensitive resistor 31 determines the exact moment when the projection 43 releases the second or trailing setting ring 2.

The aforedescribed mode of operation will take place when the scene light is of average or higher-than-average intensity. If the intensity of scene light is weak, the actuating portion or trip 46 of the leading setting ring 1 will reach the movable contact 30a of the double-throw switch 30 before the electromagnet 47 is deenergized, i.e., before the projection 43 of the lever 41 releases the trailing setting ring 2. In other words, the charging of capacitor 33 then requires more time because the resistance of the photosensitive resistor 31 is high. The emitter-collector stage of the transistor 35 does not begin to conduct current and does not block the transistor 37 before the trip 46 reaches the movable contact 30a. This movable contact 30a is then moved into engagement with the upper fixed contact (as viewed in FIG. 1) and disconnects the photosensitive resistor 31 by simultaneously connecting into the time delay circuit 49 that branch circuit which includes the photosenstive resistor 32. The characteristic of the resistor 32 is different from that of the resistor 31 and the resistor 32 then controls the charging of capacitor 33. Once the latter is properly charged, the electromagnet 47 is deenergized through transistors 35, 37 and the projection 43 of the lever 41 immediately releases the face 44 of the trailing setting ring 2 which rapidly returns its projection 10 into abutment with the projection 7 of the leading setting ring 1 to thereby close the shutter and to reduce the size of the aperture to zero. As a rule, the leading setting ring 1 will return to its uncocked position before the electromagnet 47 is deenergized in response to charging of the capacitor 33 through the second photosensitive resistor 32. This means that the size of the diaphragm aperture has been increased to its maximum value (when the ring 1 abuts against the fixed stop 8 and the projection 43 still holds the face 44 of the setting ring 2) and that the second photosensitive resistor 32 merely determines the exposure time.

It will be seen that the setting means of the improved exposure control device has two operating ranges in one of which the shutter is closed before the size of the aperture reaches its maximum value (i.e., before the leading setting ring 1 returns to fully uncocked position) and in the other of which the shutter is closed after elapse of an interval which suffices to allow for return movement of ring 1 to uncocked position and to thereby increase the size of the aperture to its maximum value. Therefore, the exposure control device can properly select both exposure values within a much wider range of intensities of scene light than all such known exposure devices of which I am aware at this time. Furthermore, the device is very simple and compact and its operation is fully automatic. It can be readily incorporated in a small still camera.

Figure 2:
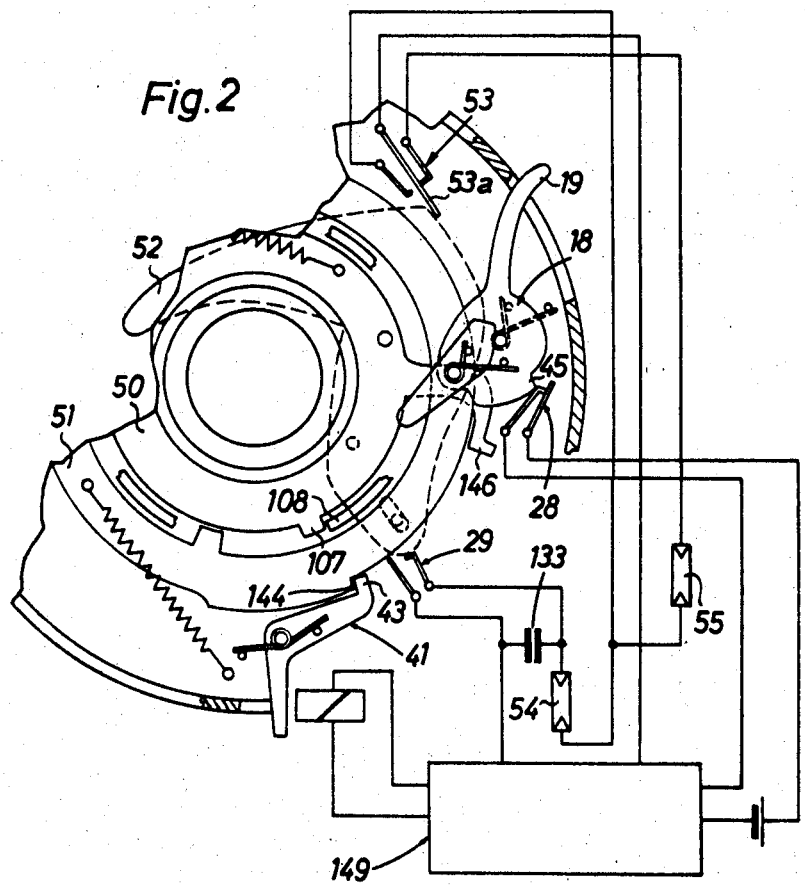
FIG. 2 is a similar view of a camera which embodies a modified exposure control device.

The exposure control device of FIG. 2 is very similar to the one which was described in connection with FIG. 1. The shutter comprises leading and trailing setting rings 50, 51 which cause pivotal movements of shutter blades 52 when they are permitted or caused to move with reference to each other. That shutter blade 52 which is actually shown in FIG. 2 takes over one function of the trip 46 (FIG. 1) by serving as a means for actuating the movable median contact 53a of a double-throw switch 53 when it is caused to assume one of its end positions in which the size of the diaphragm aperture has reached its maximum value (namely, when the leading setting ring 50 has been permitted to return to uncocked position (in which its projection 107 abuts against the stop 108) before the projection 43 of the blocking lever 41 releases the face 144 of the trailing setting ring 51). The switch 53 corresponds to the double-throw switch 30 of FIG. 1.

Another difference between the two embodiments is that the time delay circuit 149 for the trailing setting ring 51 is permanently connected with one of two branch circuits which respectively include photoelectric resistors 54, 55. The resistor 55 is connectable in the time delay circuit 149 in addition to the resistor 54, i.e., the resistor 54 remains connected with the capacitor 133 in both positions of the movable contact 53a. The resistor 55 will be connected in the time delay circuit 149 for the trailing setting ring 51 only when the shutter blade 52 causes the movable contact 53a to change its position. It is clear that, instead of being connected in series, the photosensitive resistors 54, 55 may be connected in parallel.

The operation of the exposure control device shown in FIG. 2 is analogous to that of the device which was described in connection with FIG. 1. The cam lobe 45 of the plate 18 will close the master switch 28 and the trip 146 of the leading setting ring 50 will close the control switch 29 in response to movement of the arm 19 in a counterclockwise direction.

The two illustrated exposure control devices may be modified still further without departing from the spirit of my invention. For example, the number of shutter blades 5, 6 or 52 may be increased and the two time delay circuits 49, 149 may be used in connection with many different types of shutters whose blades may but need not define the diaphragm aperture. Thus, the exposure control device which embodies my invention may be provided with a shutter which is independent of the diaphragm.

Furthermore, and though it was found that the time delay circuit for the trailing setting ring 2 or 51 cooperates very satisfactorily with branch circuits including two photosensitive resistors 31, 32 or 54, 55, it is possible to use a single photosensitive resistor and to utilize a plurality of branch circuits each of which comprises a different capacitor. Such capacitors are connected with the single photosensitive resistor in response to changes in the position of the movable contact in a multiple-throw switch corresponding to the switch 30 or 53. It is equally possible to use in the time delay circuit more than one photosensitive resistor and more than one capacitor. For example, a first capacitor of the time delay circuit will be connected with the photosensitive resistor of a first branch circuit in the first position of the movable contact 30a or 53a, and a second capacitor of the time delay circuit is then connected with the photosensitive resistor of a second branch circuit in the second position of the movable contact 30a or 53a.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a photographic camera, an exposure control device comprising movable setting means operative to select the exposure time and the size of the diaphragm aperture; actuating means movable in response to movement of said setting means; an electric time delay circuit including electromagnet means for operating said setting means as a function of the intensity of scene light within two successive operating ranges in the first of which the exposure time is varied with the size of the aperture and in the second of which the exposure time is varied while the size of the aperture remains unchanged; and first and second branch circuits characteristic of said first and second light intensity ranges, said actuating means being arranged to connect one of said branch circuits into said time delay circuit in response to completion by said setting means of said first operating range.

2. An exposure control device as defined in claim 1, wherein said actuating means is arranged to connect said one branch circuit with said time delay circuit in addition to the other branch circuit.

3. An exposure control device as defined in claim 1, wherein said actuating means is arranged to connect said one branch circuit with said time delay circuit as a substitute for the other branch circuit.

4. An exposure control device as defined in claim 1, wherein said time delay circuit comprises a double-throw switch having a contact movable between two positions in one of which said switch connects the one branch circuit into said time delay circuit and said actuating means is arranged to move said contact to such one position.

5. An exposure control device as defined in claim 4, wherein said setting means comprises a rotary setting member forming part of the camera shutter and said actuating means is provided on said rotary setting member.

6. An exposure control device as defined in claim 4, wherein said setting means comprises a rotary setting member arranged to change the position of shutter blades and wherein said actuating means is constituted by a shutter blade.

7. An exposure control device as defined in claim 1, wherein each of said branch circuits comprises a photosensitive resistor which is exposed to scene light.

8. An exposure control device as defined in claim 1, wherein said setting means constitutes a component part of a combined shutter and diaphragm having blade means defining the aperture.

9. An exposure control device as defined in claim 8, wherein said setting means comprises a leading rotary ring coupled with said blade means and a trailing rotary ring coupled with said blade means, said rings being movable with and relative to each other to open the shutter in response to movement relative to each other and said time delay circuit being arranged to regulate the movements of said trailing ring.

10. An exposure control device as defined in claim 9, wherein said actuating means is rigid with said leading ring.

11. An exposure control device as defined in claim 9, wherein said electromagnet means is energizable to hold said trailing ring against movement with said leading ring so that said blade means defines an aperture which remains open while the electromagnet means is energized, said one branch circuit being arranged to effect de-energization of said electromagnet means in said second range of light intensities.

12. An exposure control device as defined in claim 11, wherein the intensities of scene light in said second range are lower than in said first range and wherein said setting means is arranged to increase the size of the aperture to a maximum value at the time said actuating means connects said one branch circuit into said time delay circuit.

References Cited

UNITED STATES PATENTS 3,348,460　10/1967　Schmitt _____ 95—10
3,362,308　1/1968　Cooper et al. _____ 95—10

NORTON ANSHER, *Primary Examiner.*

JOSEPH F. PETERS, JR., *Assistant Examiner.*

U.S. Cl. X.R.

95—63